Figure 7:
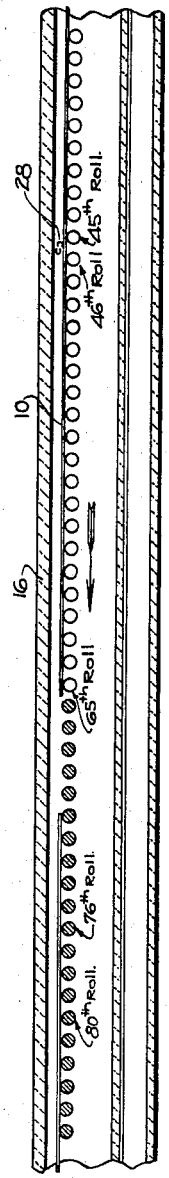

April 9, 1935.  J. L. DRAKE  1,997,402
SHEET GLASS CUTTING APPARATUS
Filed Jan. 29, 1927  3 Sheets-Sheet 1
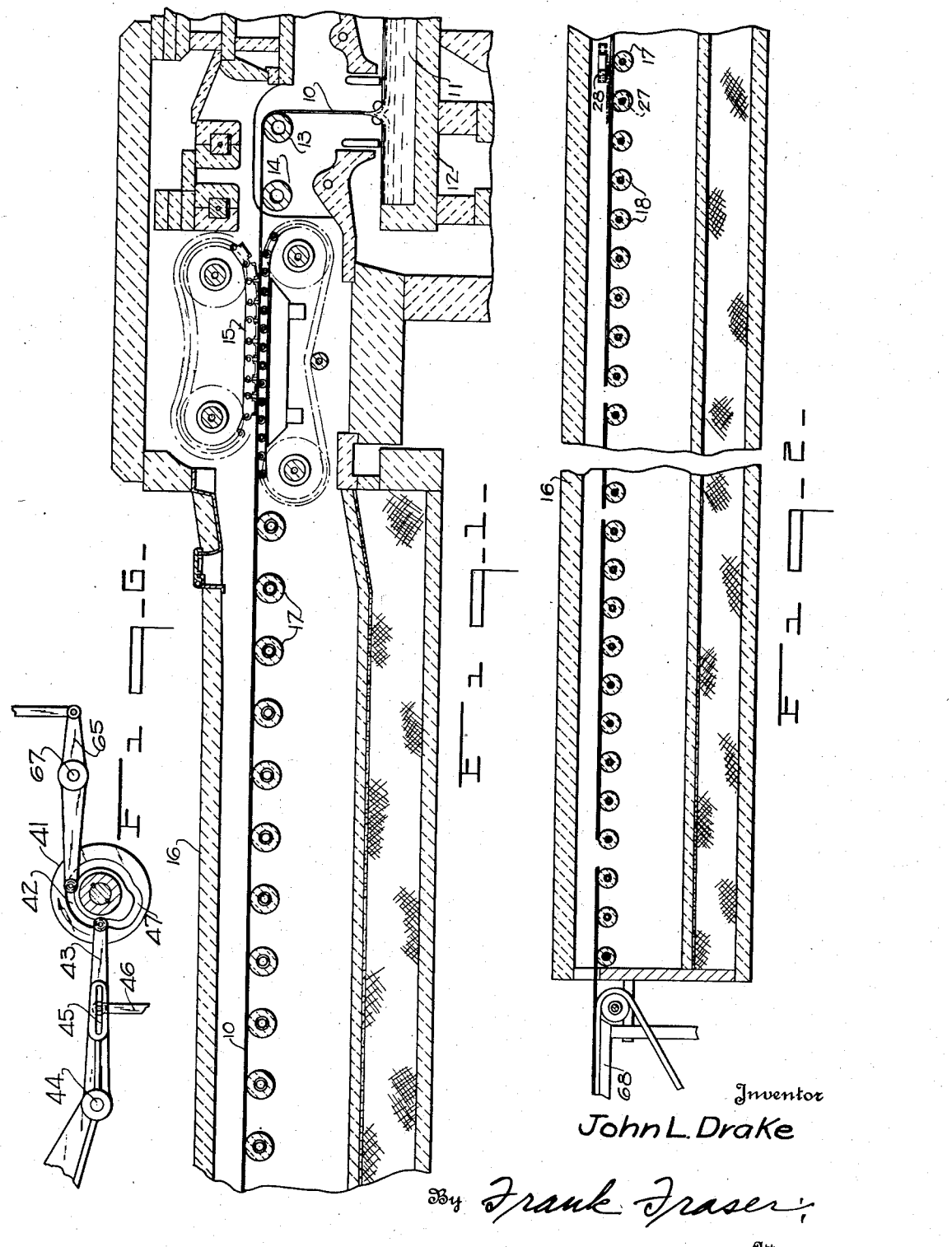
Inventor
John L. Drake
By Frank Fraser
Attorney

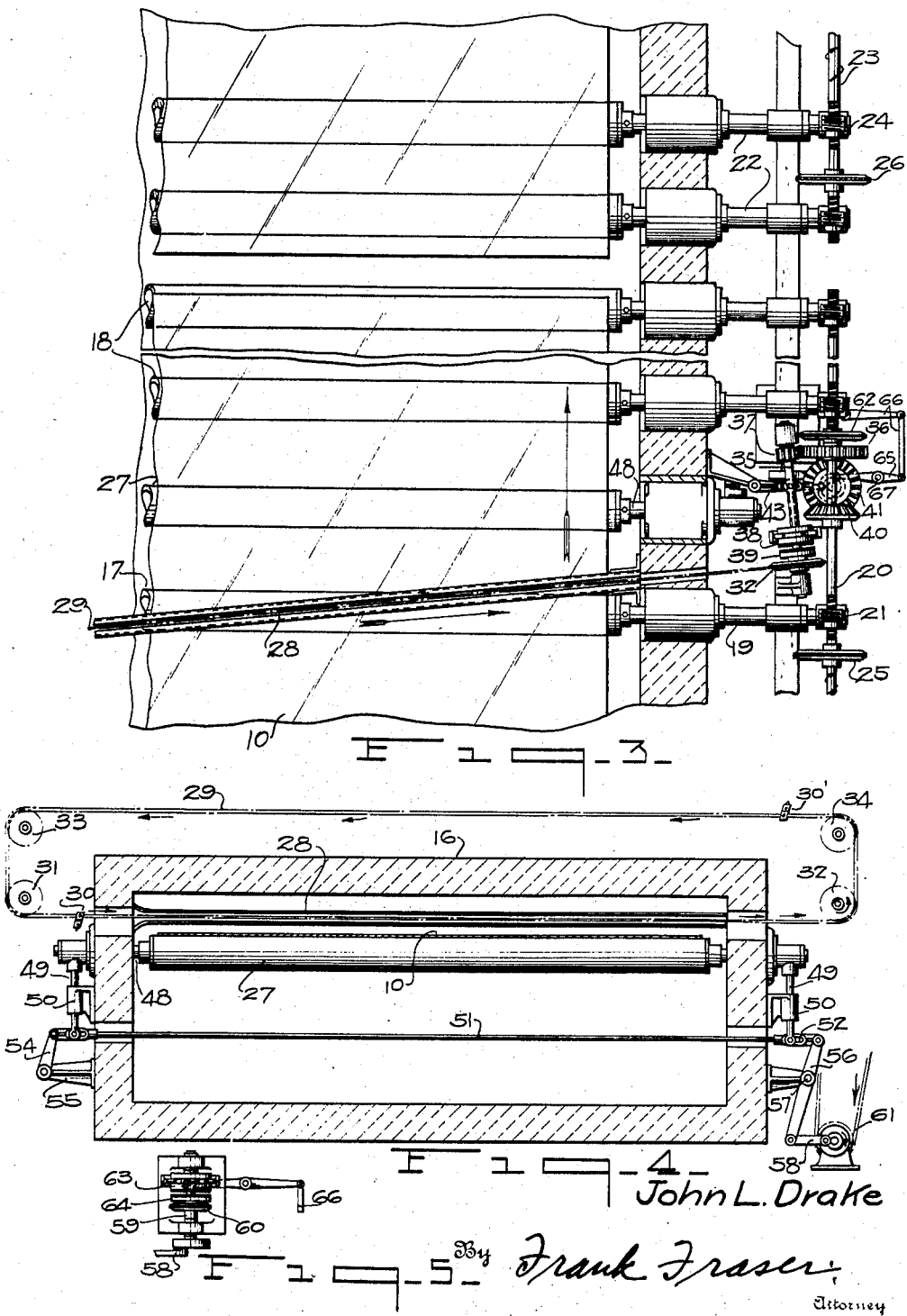

April 9, 1935.  J. L. DRAKE  1,997,402
SHEET GLASS CUTTING APPARATUS
Filed Jan. 29, 1927    3 Sheets-Sheet 3

Inventor
John L. Drake
By Frank Fraser
Attorney

Patented Apr. 9, 1935

1,997,402

UNITED STATES PATENT OFFICE 1,997,402

SHEET GLASS CUTTING APPARATUS

John L. Drake, Toledo, Ohio, assignor to Libbey-Owens-Ford Glass Company, Toledo, Ohio, a corporation of Ohio Application January 29, 1927, Serial No. 164,437

18 Claims. (Cl. 49—48)

This invention relates broadly to sheet glass apparatus, and more particularly to means for cutting a continuous ribbon of glass transversely into sheet lengths of the desired sizes.

In the patent to Colburn 1,248,809, granted December 4, 1917, there is disclosed an apparatus for producing sheet glass wherein the sheet is drawn initially in an upward direction from a source of molten glass, and subsequently deflected into the horizontal plane over a bending roll, after which the said sheet is passed over a suitable flattening table into an annealing leer wherein it is supported and carried along upon a plurality of driven leer rolls. It has been found that these leer rolls which are driven at a peripheral speed greater than the linear travel of the sheet create a pull on the said sheet causing longitudinal stretching thereof. This stretching of the sheet while plastic results in the formation of waves therein which are detrimetal to the production of a good sheet of glass. Also, since the leer rolls contact with the sheet and are positively driven at a peripheral speed slightly in excess of the linear travel thereof, there is created a relative motion between these contacting surfaces which causes the production of scratches on said sheet.

It is an aim of the present invention to provide improved sheet glass apparatus whereby the formation of waves in, and the production of scratches on the said sheet as the same is being annealed, will be reduced to a minimum, if not entirely eliminated.

An important object of the invention is to accomplish the above advantages by driving the leer rolls at the hot end of the leer at a peripheral speed substantially equal to the linear travel of the glass sheet and subsequently cutting said sheet while within the leer transversely into sheet lengths as soon as it has become sufficiently set.

Another object of the invention is to provide in sheet glass apparatus, an annealing leer containing a plurality of rolls for supporting a continuous ribbon of glass passing therethrough, the rolls at the hot end of the leer being driven at a peripheral speed substantially equal to the linear travel of the glass ribbon while the rolls at the opposite end of said leer are driven at a speed slightly in excess of the linear travel of said ribbon.

A further object of the invention is to provide in sheet glass apparatus, means for passing a continuous ribbon of glass into an annealing leer onto a plurality of rolls whose peripheral speed is substantially equal to the linear travel of said ribbon, means for periodically cutting the ribbon transversely into sheet lengths as soon as it has become sufficiently set, and a plurality of rolls driven at a peripheral speed slightly in excess of the linear travel of the ribbon for carrying away the glass after it has been cut.

A still further object of the invention is to provide in sheet glass apparatus, means for scoring a continuous ribbon of glass transversely at predetermined intervals while said ribbon is being annealed, and means acting to automatically raise the glass after it has been scored to break it along the score line.

Other objects and advantages of the invention will become more apparent during the course of the following description.

Figure 8:
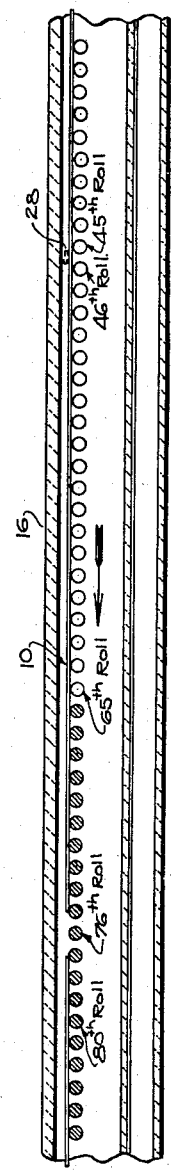
Figure 9:
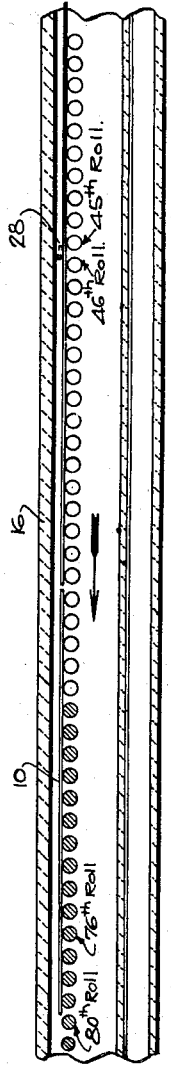

In the drawings wherein like numerals are employed to designate like parts throughout the same, Fig. 1 is a vertical longitudinal section through a portion of the improved sheet glass apparatus constructed in accordance with the present invention, Fig. 2 is a similar view of another portion of the apparatus, Fig. 3 is a top plan view of the cutting apparatus showing the manner in which the same is associated with the annealing leer, Fig. 4 is a transverse section taken through the annealing leer showing the mechanism for breaking the glass after it has been scored, Fig. 5 is a detail view of the clutch arrangement for operating the breaking mechanism, Fig. 6 is a detail plan view, partially in section, of the clutch operating mechanism, and Figs. 7, 8, and 9 are diagrammatic views showing the manner in which the glass is carried through the leer.

Referring now to the accompanying drawings, and more particularly to Figs. 1 to 6 inclusive, the continuous sheet or ribbon of glass 10 is drawn upwardly from a source of molten glass 11 contained in the receptacle or draw pot 12. The continuous sheet 10 at a substantial distance from its source, is deflected into the horizontal plane about an internally cooled rotatable bending roll 13, after which it is passed over an idler roll 14, through the combined drawing and flattening mechanism 15 into the annealing leer 16, where it is gradually reduced to room temperature as is well known in the art.

The said sheet 10 is supported and carried along within the leer, first upon a series of horizontally aligned rolls 17, and then upon a second series of horizontally aligned rolls 18, which last rolls are driven at a peripheral speed slightly in excess of the peripheral speed of the rolls 17. The series of rolls 17 are mounted upon shafts 19 which extend outwardly of the leer at one side thereof and are driven by a drive shaft 20 through the intermediary of suitable worm gearing 21, while the second series of rolls 18 mounted upon similar shafts 22, which also extend outwardly of the leer at one side thereof, are driven from a lay shaft 23 through the intermediary of suitable worm gearing 24.

A sprocket and chain connection 25 is provided for driving the shaft 20 from any suitable source of power, while a second chain and sprocket connection 26 is provided for driving the lay shaft 23. The two series of shafts 19 and 22 are so driven at different speeds that the series of rolls 17 will be rotated at a peripheral speed substantially equal to the linear travel of the glass ribbon 10, while the second series of rolls 18 will be driven at a peripheral speed slightly in excess of the linear travel of said ribbon. Positioned between and separating the two series of rolls 17 and 18 is a similar roll 27, the purpose of which will be more clearly hereinafter apparent.

In accordance with the present invention, there is arranged within the leer 16 adjacent to and in advance of the roll 27, a guide member 28 extending diagonally thereof, as shown in Fig. 3. This member serves as a guide for the lower run of the endless chain 29 which carries the two scoring members 30 and 30'. The endless chain 29 is trained about four sprockets as shown in Fig. 4; the lower sprockets 31 and 32 and the upper sprockets 33 and 34. The sprockets 31, 33, and 34 are idler sprockets, while the sprocket 32 is adapted to be positively driven at times. This sprocket 32 is loosely mounted upon a shaft 35 driven from the drive shaft 20 through the gears 36 and 37. Carried by the shaft 35 are the clutch members 38 and 39, so arranged that upon movement of the clutch member 38 into engagement with the clutch member 39, the sprocket 32 and endless chain 29 will be positively driven in a counter-clockwise direction to move the scoring member 30 or 30' transversely across the moving sheet 10.

In order to periodically move the clutch member 38 into and out of engagement with the clutch member 39 whereby to cause the sheet 10 to be scored at predetermined intervals, there is keyed to the drive shaft 20 a bevelled gear 40 meshing with the correspondingly bevelled gear 41, said bevel gear 41 being provided, as shown in Fig. 6, with a cam groove 42. Loosely engaged within this groove 42 is one end of a lever 43 pivoted at its opposite end as at 44. This lever is provided intermediate its ends with a longitudinal slot 45, and slidably engaged therein is one end of an arm 46, adapted to be connected with the clutch member 38 in such a manner that upon movement thereof in one direction, the said clutch member 38 will be moved in the opposite direction to engage or disengage the clutch member 39.

In the operation of the invention as thus far described, the sheet or ribbon of glass 10 is drawn from the receptacle or draw pot 12 in the usual manner and passed into the leer 16 onto the rolls 17. The drive shaft 20 is continuously driven by means of the chain and sprocket connection 25 above described and upon rotation of this shaft, the shaft 35 will also be rotated and the gear 41 will be driven in a clockwise direction by the gear 40. As the said gear 41 rotates, the end of the lever 43 engaging within the raised point 47 of the groove 42, will be caused to move outwardly whereby to move the clutch member 38 into engagement with the clutch member 39. When these clutch members are engaged with one another, the sprocket 32 and endless chain 29 will be driven to move either the scoring member 30 or 30' transversely across the sheet to score the same. These scoring members are so arranged that as one is moved across the sheet to complete the score, the other will be brought into position for the next score. Due to the fact that the sheet 10 is continuously moving, the guide 28 and endless chain 29 are positioned diagonally of the leer as shown in Fig. 3, so that each score line will be parallel to the preceding score line and so that these score lines will extend straight across the sheet and not diagonally thereof. Of course, as soon as the raised point 47 of cam groove 42 passes beyond the end of lever 43, the said lever will be moved in the opposite direction to disengage the clutch members 38 and 39.

After the sheet has been scored in the above manner, some means must necessarily be provided for breaking the same along the score line, and in order that this might be accomplished, the roll 27 is mounted upon the shaft 48 for vertical movement. Secured to the opposite ends of the shaft 48 are the depending pins 49 slidably mounted within bearing brackets 50, and being slidably connected with the opposite ends of a transversely extending rod 51, the lower ends of said pins 49 operating within slots 52. Pivoted to one end of the rod 51 is a link 54 pivoted to the bracket 55, while pivoted to the opposite end of the rod 51 is one end of a lever 56 pivoted intermediate its ends as at 57 and at its opposite end to a wheel crank 58 mounted on the shaft 59. Keyed to this shaft is a sprocket 60 carrying a sprocket chain 61, said chain being trained about a sprocket 62 keyed to the shaft 20 so that upon rotation of the said shaft 20, the shaft 59 will also be rotated to rock the lever 56 about its pivot 57 whereby to raise or lower the roll 27. Also mounted upon the shaft 59 are the clutch members 63 and 64, said clutch member 63 being movable into or out of engagement with its companion clutch member 64. The clutch member 63 is connected with the lever 65 through the medium of a plurality of pivotally connected links 66. The lever 65 is pivoted intermediate its ends as at 67 and has its free end loosely engaged within the cam groove 42 into the gear 41.

The operation of the breaking mechanism just described is as follows: As soon as the scoring member 30 or 30' has been moved transversely across the sheet to score the same, the raised point 47 of the cam groove 42 will rock the lever 65 about its pivot 67 whereby to move the clutch member 63, through the medium of the pivotally connected links 66, into engagement with the clutch member 64, whereupon the shaft 59 and crank 58 will be rotated to rock the lever 56 about its pivot 57. The rocking of this lever will act to move the rod 51 transversely and upwardly with the result that the roll 27 will be moved sufficiently to raise the glass causing it to break along the score line. After the glass has been broken, it will be carried along more rapidly upon the series of faster moving rolls 18. Of course, as soon as the raised point 47 of the cam groove 42 passes beyond the lever 65, the clutch member 63 will be thrown out of engagement with the clutch member 64.

Inasmuch as the rolls at the hot end of the leer are driven at a peripheral speed substantially equal to the linear travel of the sheet, the tendency towards the stretching of said sheet will be eliminated and relative motion between these parts reduced to a minimum so that the formation of waves in and the production of scratches on said sheet will be obviated. After the sheet has become sufficiently set to cut, the tendency towards the formation of waves therein or the production of scratches thereon is reduced. The sheets of glass, after being cut, are adapted to pass from the leer 16 onto a table 68 from which they can be easily removed.

The present invention is also advantageous in that it reduces the waste of glass due to breakage occasioned by the formation of so-called "snakes" therein. In other words, these snakes which form in the sheet while being annealed, usually run the entire length of the annealing leer thereby causing considerable breakage and waste of glass. By cutting the continuous sheet into sheet lengths in accordance with the present invention, however, any snakes which might form in any one of the sheet lengths can travel the length of that particular section only so that waste of glass due to breakage caused by these snakes will be materially reduced.

In Figs. 7, 8, and 9 have been shown diagrammatically the manner in which the ribbon of glass or continuous sheet 10 is carried through the annealing leer 16. In certain types of these leers, anywhere from one hundred and fifty to more than two hundred rolls are provided and are spaced approximately one foot apart. According to the present invention, the first sixty-five leer rolls (which are equivalent to the series of rolls 17 above described) are driven at a peripheral speed equal to the linear travel of the sheet, while the balance of the rolls (which are the equivalent of the series of rolls 18 above described) are driven at a slightly faster speed. The first fifty rolls may be formed of an asbestos composition while the next thirty rolls are preferably of wood or nickel, the main idea being to obtain a roll which will allow relative motion between the sheet and roll without scratching the sheet.

The guide 28 for the scoring members 30 and 30' is positioned between the 45th roll and 46th roll, while the 46th roll corresponds to the breaker roll 27 above described. As the end of the continuous sheet 10 passing through the leer reaches the 65th roll, as shown in Fig. 7, the cutter at the 45th roll moves across the sheet, and as the cut finishes the 46th roll is automatically raised to separate the glass. The twenty foot section of glass which has been separated from the continuous glass sheet travels at the same speed as said sheet until the front end thereof reaches the 76th roll where, being acted upon by eleven rolls running at a faster speed as against nine rolls at the slower speed, it gradually separates from the balance of the sheet.

To and including the 65th roll, the linear speed of the sheet is the same as the peripheral speed of the rolls. Consequently, there is no stretching or scratching. As the front end of the twenty foot section passes from the 65th to the 76th rolls, the section has the speed of the ribbon following, the force tending to speed up the section being neutralized by the force tending to restrain it. Although the 65th to 76th rolls, having a greater speed than the sheet, slide beneath the sheet, no scratching results due to the composition of the rolls, and no stretching results since the sheet has become fully set.

As the front end of the sheet section reaches the 76th roll, the force tending to speed up the section over-balances the force restraining it, and the section picks up speed and separates from the balance of the sheet as shown in Fig. 9. The 56th to 65th rolls then travel slower than the sheet section, but due to the composition of the rolls, no scratching results.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:—

1. In sheet glass apparatus, an annealing leer for receiving a continuously moving sheet of glass, a plurality of rotatable members for supporting the sheet within said leer, means for automatically scoring the sheet transversely at predetermined intervals as it passes through said leer, means acting at the completion of the scoring operation to automatically raise one of said rotatable members to break the glass along the score line, and a plurality of rotatable members driven at a peripheral speed in excess of the linear travel of said sheet for carrying away the glass after it has been cut.

2. In sheet glass apparatus, an annealing leer for receiving a continuously moving sheet of glass, a plurality of rotatable members for supporting the sheet within said leer, said members being driven at a peripheral speed substantially equal to the linear travel of said sheet, means for automatically scoring the sheet transversely at predetermined intervals as it passes through said leer, means acting at the completion of the scoring operation to automatically raise one of said rotatable members to break the glass along the score line, and a plurality of rotatable members driven at a peripheral speed in excess of the linear travel of said sheet for carrying away the glass after it has been cut.

3. In sheet glass apparatus, an annealing leer, means for supporting and carrying a sheet through said leer, a cutter carrying element arranged within the leer, a cutter carried by said cutter carrying element, means for moving the cutter transversely across the sheet to score the same, and means also operable by the cutter actuating means for breaking the sheet along the score line.

4. In sheet glass apparatus, an annealing leer, means for supporting and carrying a continuously moving sheet of glass through said leer, a cutter carrying element arranged within the leer, a cutter carried by said cutter carrying element, means for moving the cutter transversely across the sheet to score the same at predetermined intervals, and means also operable by the cutter actuating means and acting automatically at the completion of the scoring operation to raise a portion of said supporting means whereby to break the sheet along the score line.

5. In sheet glass apparatus, an annealing leer, rotatable means for supporting and carrying a sheet through said leer, means for driving said rotatable means, a cutter carrying element arranged within the leer, a cutter carried thereby, means operated from said driving means for moving the cutter transversely across the sheet to score the same, and means also operated from said driving means for breaking the sheet along the score line.

6. In sheet glass apparatus, an annealing leer, rotatable means for supporting and carrying a continuously moving sheet of glass through said leer, means for driving said rotatable means, a cutter carrying element arranged within the leer, a cutter carried thereby, means operated from said driving means for moving the cutter transversely across the sheet at predetermined intervals to score the same, and means also operated from said driving means and acting automatically at the completion of the scoring operation to raise a part of said supporting means to break the sheet along the score line.

7. In sheet glass apparatus, a plurality of rotatable members for receiving and carrying a sheet of glass, said rotatable members being driven at a peripheral speed substantially equal to the linear travel of the sheet, means for scoring the sheet transversely at predetermined intervals, means acting automatically to raise one of said rotatable members upwardly to break the sheet along the score line, and means for carrying the sheet away.

8. In sheet glass apparatus, a plurality of rotatable members for receiving and carrying a sheet of glass, said rotatable members being driven at a peripheral speed substantially equal to the linear travel of the sheet, means for scoring the sheet transversely at predetermined intervals, means acting automatically to raise one of said rotatable members upwardly to break the sheet along the score line, and means for carrying the sheet away at a relatively faster rate of speed after it has been cut.

9. In sheet glass apparatus, a plurality of rolls for receiving and carrying a sheet in a generally horizontal plane, means for scoring the sheet transversely at predetermined intervals, means for elevating one of said rolls out of its normal position and above the horizontal plane in which the sheet is traveling to break the sheet along the score line, and means for carrying the sheet away.

10. In sheet glass apparatus, a plurality of rolls for receiving and carrying a sheet in a generally horizontal plane, means for automatically scoring the sheet transversely at predetermined intervals, means for elevating one of said rolls out of its normal position and above the horizontal plane in which the sheet is traveling to break the sheet along the score line, and means for carrying the sheet away.

11. In sheet glass apparatus, a plurality of rolls for receiving and carrying a sheet in a generally horizontal plane, means for automatically scoring the sheet transversely at predetermined intervals, means acting automatically to raise one of said rolls upwardly above the horizontal plane in which the sheet is moving to break the sheet along the score line, and means for carrying the sheet away.

12. In sheet glass apparatus, an annealing leer for receiving a continuously moving sheet of glass, a plurality of spaced rolls disposed therein and arranged to carry the sheet horizontally through said leer, means positioned within the leer for scoring the moving sheet transversely, and means associated with one of said rolls for elevating the same out of the horizontal plane in which the sheet is traveling to break the sheet along said score line.

13. A runway for use in connection with a leer, comprising a series of rolls spaced along the runway in relatively fixed positions with respect to the length thereof, one of which rolls, located intermediate the ends of the runway is mounted for vertical movement, means for raising said roll so that its periphery lies above the level of the other rolls of runway, and means for driving said other rolls.

14. The combination with a heat-treatment chamber of means for causing the articles to travel through said chamber, said means being arranged to progressively increase the speed of travel of the articles toward the discharge end of the chamber.

15. The combination with a heat-treatment chamber characterized by decreasing temperatures toward the discharge end of the chamber, and means for causing the articles to travel through said chamber at a speed increasing toward the discharge end of the chamber.

16. The combination with a heat-treatment chamber of means for causing the articles to travel through said chamber, the speed of said means being regulated to cause a separation of the articles as they move toward the discharge end of said chamber.

17. In a leer for annealing glassware, the combination of the chamber having a heated portion and a cooled portion, and conveyer means in said chamber, said conveyer means comprising a relatively low speed in the heated portion of the chamber and a relatively high speed in the cooled portion of the chamber.

18. A runway for use in connection with a leer, comprising a series of rolls spaced along the runway in relatively fixed positions with respect to the length thereof, one of which rolls, located intermediate the ends of the runway, is mounted for vertical movement, and means for raising said roll so that its periphery lies above the level of the other rolls of the runway so as to apply pressure to the glass and cause it to crack.

JOHN L. DRAKE.